United States Patent [19]

Payne et al.

[11] Patent Number: 4,633,067

[45] Date of Patent: Dec. 30, 1986

[54] TOUCH CONTROL ARRANGEMENT FOR AN ELECTRICAL APPLIANCE

[75] Inventors: Thomas R. Payne; David A. Schneider, both of Louisville, Ky.

[73] Assignee: General Electric Company, Louisville, Ky.

[21] Appl. No.: 643,251

[22] Filed: Aug. 22, 1984

[51] Int. Cl.$^4$ .............................................. H05B 1/02
[52] U.S. Cl. .................................... 219/483; 219/506; 219/486; 340/365 E
[58] Field of Search ............... 219/483, 486, 411, 413, 219/494, 506, 10.55 B, 497; 307/39–41; 364/900; 340/365 R, 365 E

[56] References Cited

U.S. PATENT DOCUMENTS

| | | | |
|---|---|---|---|
| 3,819,906 | 6/1974 | Gould, Jr. | 219/506 |
| 4,149,217 | 4/1979 | Tucker | 361/358 |
| 4,190,756 | 2/1980 | Foerstner | 219/10.55 B |
| 4,206,336 | 6/1980 | Cunningham | 219/10.49 R |
| 4,232,210 | 11/1980 | Oida et al. | 219/10.55 B |
| 4,266,118 | 5/1981 | Takase et al. | 219/492 |
| 4,308,443 | 12/1981 | Tucker et al. | 219/10.49 R |
| 4,447,692 | 5/1984 | Mierzwinski | 219/10.55 B |

FOREIGN PATENT DOCUMENTS 2041673 9/1980 United Kingdom ............... 219/486

*Primary Examiner*—M. H. Paschall
*Attorney, Agent, or Firm*—H. Neil Houser; Radford M. Reams

[57] ABSTRACT

An improved touch control circuit arrangement for electrical appliances having one or more electrical loads to be individually controlled in accordance with user selected power settings. Each load has associated with it a power relay for coupling the load to an external power supply. Each relay is coupled to a latch circuit operative when set to close the relay and when reset to open the relay. The touch control arrangement includes a matrix array of touch keys having an input line for each row and an output line for each column to facilitate the multiplexing of touch key information to the microprocessor in conventional fashion. However, the OFF keys are continuously enabled and coupled to the reset input of the associated latch circuit such that user actuation of an OFF key directly resets the relay control circuit for the associated load. This enables the user to turn off the load independent of the microprocessor. Each ON key is coupled to the set input of its associated latch circuit such that both actuation of the ON key and an enable signal from the microprocessor are required to set the latch circuit. This prevents the inadvertent closure of the relays such as might otherwise result from microprocessor failure.

13 Claims, 7 Drawing Figures

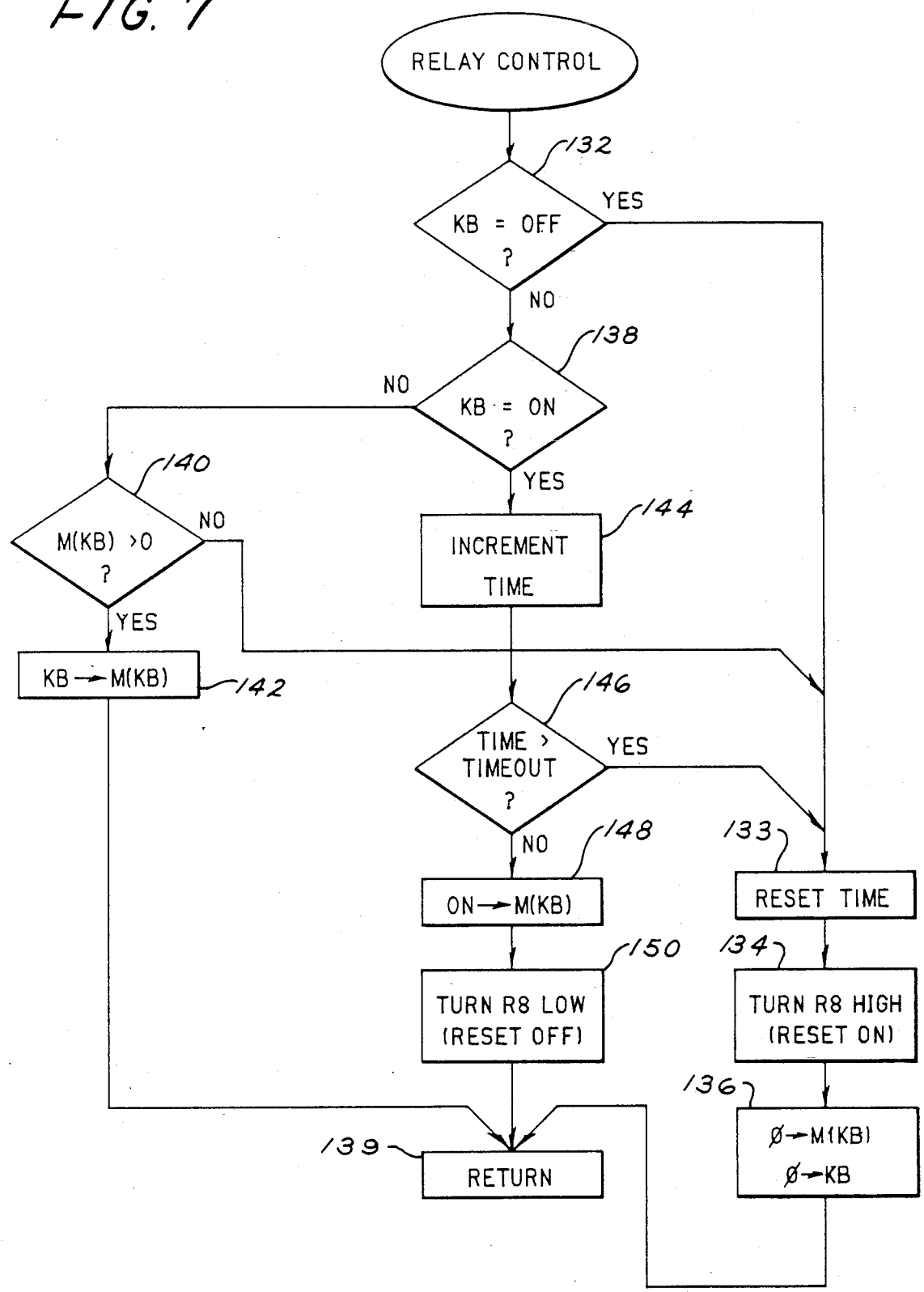

TOUCH CONTROL ARRANGEMENT FOR AN ELECTRICAL APPLIANCE

BACKGROUND OF THE INVENTION

This invention relates generally to an improved touch control circuit arrangement for electrical appliances of the type having one or more electrical loads to be individually controlled in accordance with user selected inputs, such as, for example, domestic electric range having a plurality of surface heating units for cooking.

Electronic touch control panels enabling the user to select a variety of operating modes and power settings as well as ON and OFF are well known particularly in appliances such as microwave ovens. Typically, the touch panel involves a matrix array of touch switch members or keys having a plurality of input lines enabled by signals from the microprocessor control and output lines to couple the enable signal back to the microprocessor for sensing an actuated key. In such arrangements user inputs including ON/OFF selections are multiplexed into the microprocessor and require the microprocessor to be operating properly in order for the user inputs to be implemented.

It is highly desirable that the user be able to turn off the appliance; that is, interrupt or prevent energization of the power circuitry even if there is a microprocessor failure. Microwave ovens are typically equipped with a safety door interlock switch arrangement which operates to interrupt energization of the power supply when the door is open. Such circuits work independently of the microprocessor and hence inherently enable the user to turn off the appliance independently of the microprocessor by simply opening the door. Range cooktops, however, do not have such an interlock arrangement for the surface units. Consequently, some means is needed to enable the user to turn off the surface units even in the event of a microprocessor failure. One solution would be to provide dedicated ON/OFF circuits for each of the surface units of the appliance. The cost and complexity of the duplicate circuitry renders this approach undesirable. It would be desirable therefore to provide a control circuit which retains the advantages of the multiplexed keyboard arrangement and which also enables the user to turn off the power circuitry independently of the microprocessor.

It is, therefore, an object of the present invention to provide an improved touch control circuit for an appliance in which user inputs are provided to the microprocessor controller in multiplex fashion thereby avoiding the cost and complexity of duplicate ON and OFF circuitry while directly coupling the OFF key for each surface unit directly to the power control circuitry to enable the user to turn off the appliance independently of the microprocessor.

BRIEF SUMMARY OF THE INVENTION

In accordance with the present invention a control circuit is provided for an appliance of the type incorporating an electrical load adapted for energization by an external power supply in accordance with user selected power settings including ON and OFF. The circuit includes a plurality of user actuable switch means including an ON switch and an OFF switch. An electronic controller controls energization of the electrical load in accordance with user actuation of the user actuable switch means. The controller includes means for periodically enabling the switches including the ON switch to detect user actuation thereof. The OFF switch means is continuously enabled.

A power control relay is operative in a first operating condition to enable energization of the electrical load by the external power supply and in a second operating condition to prevent energization of the load. An electronic latch circuit, switchable between a first state and a second state, is effective in its first state to establish the first operating condition for the relay and its second state to establish the second operating condition for the relay.

The ON switch is operative when both user actuated and enabled by said scanning means to switch the latch circuit to its first state. The constantly enabled OFF switch means is operative when actuated to switch the latch circuit to its second state independent of the scanning means.

By this arrangement the state of the plurality of user actuable switches including the ON and OFF switches are multiplexed into the controller with the OFF switch also being directly coupled to its associated latch circuit to turn off the circuit preventing energization of the electrical load in response to user actuation independently of the electronic controller. Additionally, since both user actuation and the scan signal are required to switch the latch circuit to its first state, the power relay cannot be closed due to a controller malfunction.

In a particularly advantageous application of the invention the control circuit is applied in an appliance having a plurality of electrical loads each selectively energized in accordance with user inputs. The plurality of user actuable switch members includes a set of switches including an ON switch and an OFF switch and various power settings, for each of the electrical loads, with the switches being disposed in a matrix array having a plurality of input scan lines and a plurality of output lines. The controller includes the scanning circuit operative to sequentially enable the input lines of the matrix array. Some at least of the switch members, including the ON switch members, are operative to produce an output signal on an associated output line when user actuated and the associated input line is enabled by the controller. Some at least of the switch members, including the OFF switch members, are operative when actuated to produce an output signal on an associated output line when user actuated regardless of the state of its associated input scan line. Circuit means is also provided separate from said controller to continuously operatively enable each of the OFF switch members. Logic circuit means responsive to the input and output lines of the associated OFF switch members provides an off signal to a common input of the controller when any of the OFF switch members is actuated and its associated input line is enabled by the controller so that the state of each OFF switch member is input to the controller in multiplex fashion.

The control circuit further includes a plurality of power relays, each relay being associated with one of the loads and operative in a first operating condition to enable energization of its associated load and in a second operating condition to prevent energization of its associated load by an external power supply. A separate electronic latch circuit is provided for each load having first and second inputs for switching the latch between first and second states respectively, each latch circuit being operatively coupled with an associated one of the relays to establish the first operating condition for its associated relay when the latch is in its first state and the second operating condition for its associated relay when in its second state. The matrix output line associated with each ON switch member is coupled to one input of its associated latch circuit and the output line associated with each OFF switch member is coupled to the other input of its associated latch circuit. Each latch circuit is switched to its first state when its associated ON switch member is actuated and the associated input scan line is enabled and switched to its second state when its associated OFF switch member is actuated. The OFF switch members by this arrangement are effective when actuated to interrupt energization of its associated loads independently of the controller.

In accordance with a further aspect of this invention a single LOCK switch member is included in the touch switch array. The LOCK switch member enables the user to select the LOCK condition, which prevents the controller from responding to user inputs. The LOCK switch member is continuously enabled similarly to the OFF switch members. The LOCK switch member is coupled to the other input of each of the latch circuits such that user actuation of the LOCK switch switches all of the latch circuits to the second state independently of the controller.

BRIEF DESCRIPTION OF THE DRAWINGS

While the novel features of the invention are set forth with particularity in the appended claims, the invention as to organizational content will be better understood and appreciated along with other objects and features thereof from the following detailed description taken in conjunction with the drawings in which:

FIG. 7 is a flow diagram illustrating a relevant portion of the control program incorporated in the microprocessor in the circuit of FIG. 3.

Throughout the figures like reference numerals designate identical or similar components.

DETAILED DESCRIPTION OF THE ILLUSTRATIVE EMBODIMENT

Figure 1:
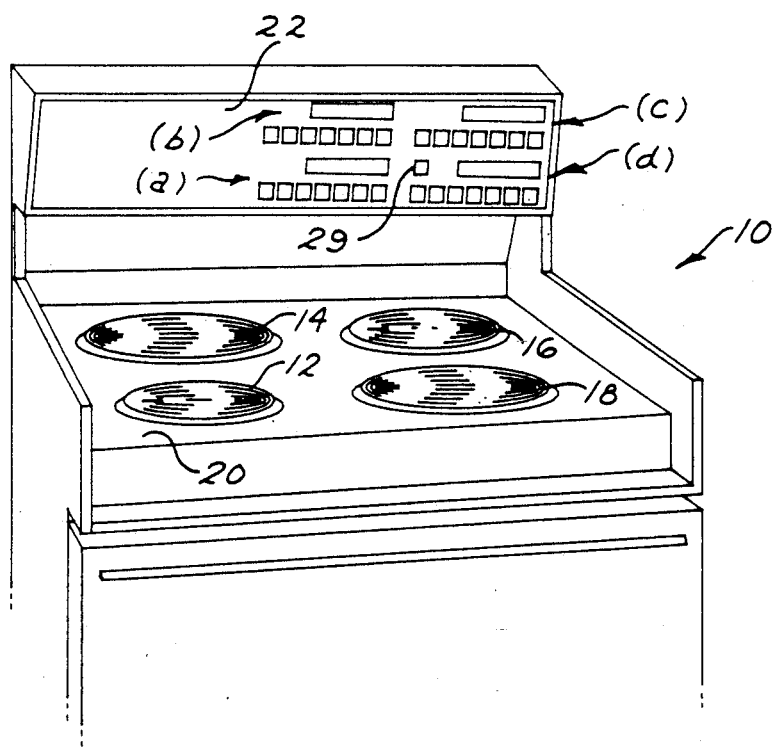
FIG. 1 is a front perspective partial view of an electric range illustratively embodying the control circuit arrangement of the present invention.
Figure 2:
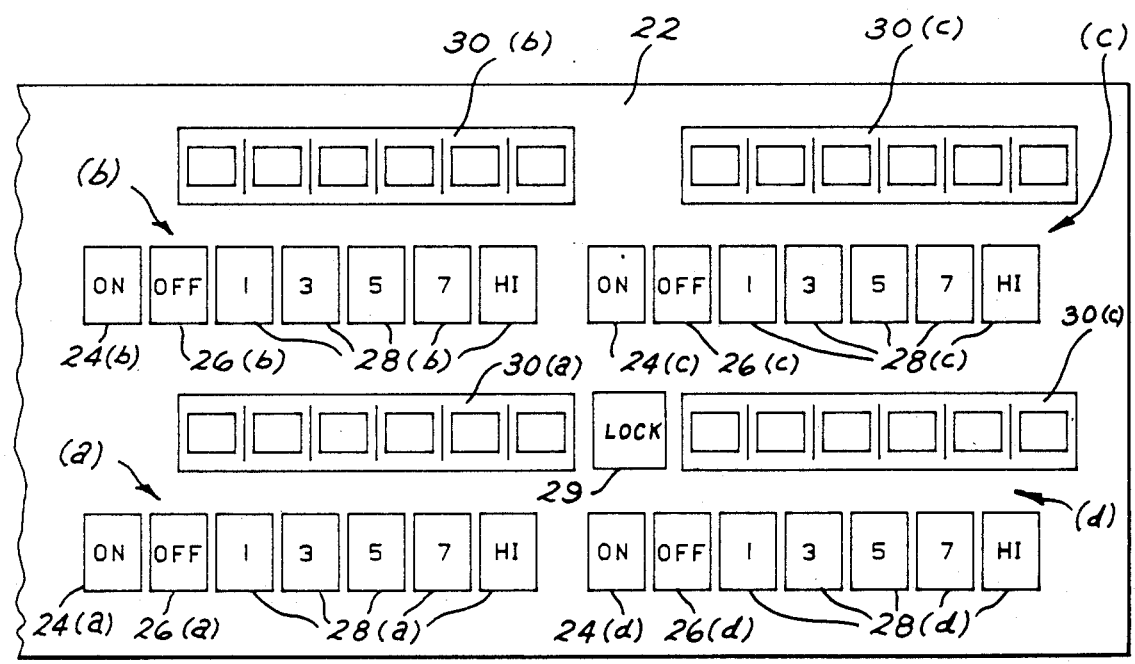
FIG. 2 is a greatly enlarged fragmentary view of the control panel of the range of FIG. 1 showing the details of the touch key array.

FIG. 1 represents an electric range 10 incorporating a control arrangement illustratively embodying the present invention. Range 10 includes four conventional electric surface units comprising resistive heating elements 12, 14, 16 and 18 supported from a substantially horizontal support surface 20. Each of elements 12 through 18 are adapted to support cooking utensils such as frying pans, sauce pans, teakettles, etc. placed thereon for heating. A control and display panel 22 provides an array of user actuable touch keys and an associated display area designated generally (a), (b), (c) and (d) for surface units 12, 14, 16 and 18 respectively. As best seen in FIG. 2 each control and display set comprises seven touch keys each set including an ON key designated 24(a)–24(d) for sets (a)–(d) respectively, an OFF key designated 26(a)–26(d) for sets (a)–(d) respectively, and five power setting selection keys designated generally 28(a)–28(d) for sets (a)–(d) respectively. Adjacent each set of seven keys is a display area 30(a)–30(d) for elements 12–18 respectively for displaying power level selection information to the user in bar graph format.

In addition, a common LOCK touch key 29 is provided which, when actuated, effectively turns off surface units 12–18 and initiates a control routine which prevents further operation of all of the surface units until the system is unlocked by user entry of the appropriate code.

In the description herein, the term key or touch key is used generically to refer to the user actuable data entry switch members provided on the appliance control. In the illustrative embodiment the touch keys may be standard conventional flexible membrane switch contactors providing a basically mechanical momentary switch in which the contacts are closed while user pressure is applied to the touch key area of the display. It will be appreciated, however, that other means of providing user actuable touch keys could be similarly employed such as, for example, a capacitive touch type of touch key. Similarly, in the illustrative embodiment a total of seven keys for each surface unit are provided. It will be appreciated that more or less touch keys could be similarly employed.

Figure 3:
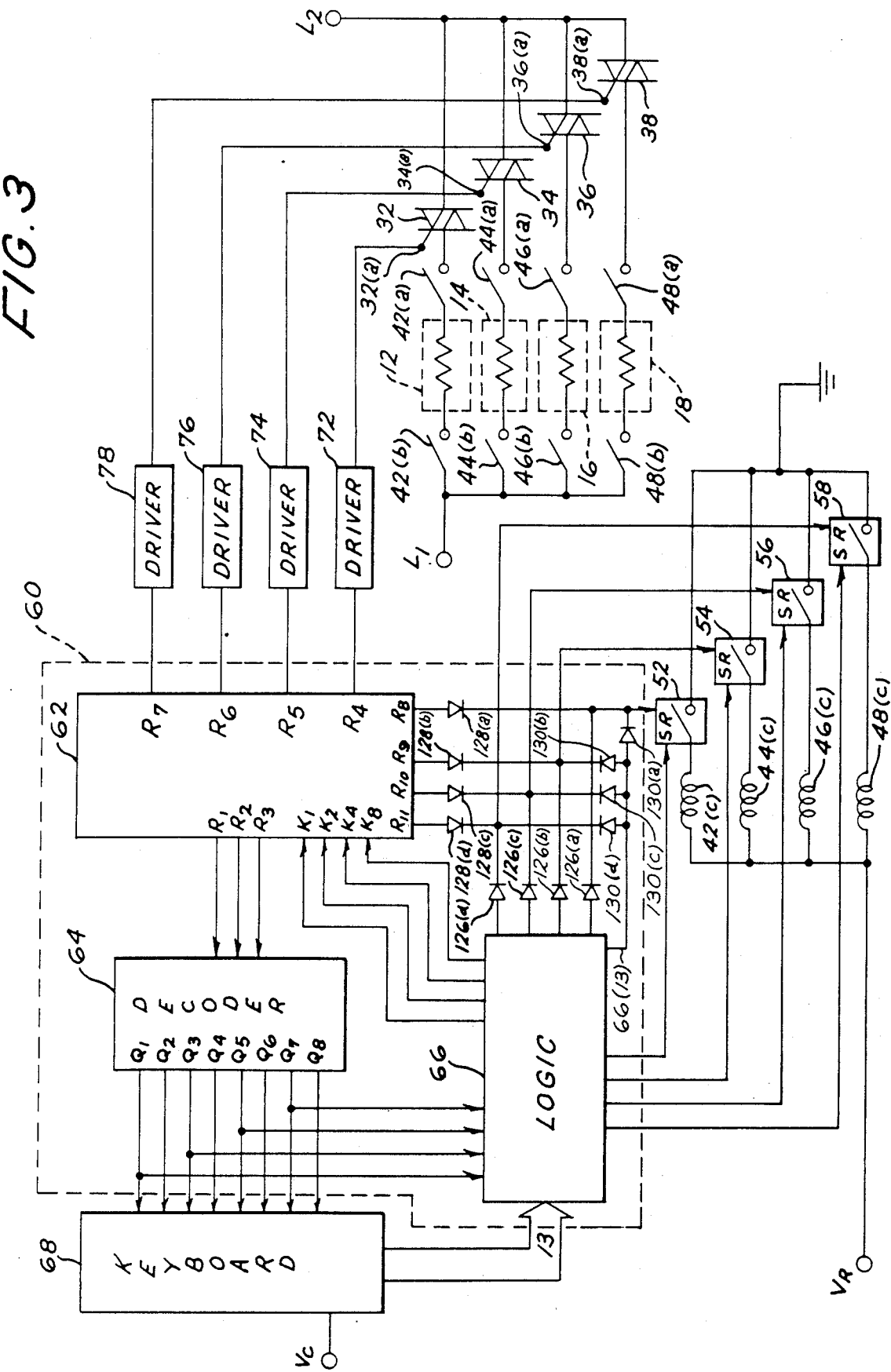
FIG. 3 is a simplified schematic diagram of a control circuit illustratively embodying the circuit of the present invention as embodied in the range of FIG. 1.

A generalized partial block diagram and partial schematic diagram of the power control arrangement for the surface units 12 through 18 of range 10 is shown in FIG. 3. Each of surface units 12–18 is coupled to a standard 240 volt, 60 Hz, AC power source via power lines designated L1 and L2 through a respective one of duty cycle controlled switching devices 32 through 38 and a pair of power relay contacts 42(a) and 42(b) through 48(a) and 48(b) respectively. Relay contact pairs 42(a) and 42(b) through 48(a) and 48(b) are contact members for single-throw double-pole power control relays which serve when open to electrically isolate associated surface units 12–18 respectively from the power lines L1 and L2. The state of the contacts for each relay is determined by the operating condition of its associated one of relay coils 42(c)–48(c) respectively. Each of relay coils 42(c)–48(c) are energized by DC voltage supply $V_R$. Current flow through coils 42(c)–48(c) is controlled by associated electronic latch circuitry 52 through 58 respectively, represented in highly schematic fashion in FIG. 3 as switches each having a first input S and a second input R for setting and resetting the latch corresponding to closing and opening the latch switch respectively. The actual latch circuitry will be hereinafter described in greater detail.

In the illustrative embodiment each of the power relays is a normally open device. The contacts 42(a) and (b)–48(a) and (b) are closed when the associated coil (42(c)–48(c) respectively) is in its energized operating condition and open when the associated coil is in its unenergized operating condition. It will be appreciated, however, that normally closed relay devices could be similarly employed with the appropriate reversal in operating conditions of the coil. As will be hereinafter described user actuation of the ON touch key for one of the surface units causes the associated coil to be energized, thereby closing the power control relay contacts and holding them in their closed position during ON modes. User actuation of an OFF key interrupts energization of the associated relay coil thereby opening the associated relay contacts to electrically isolate the associated surface unit from the power line.

Triacs 32-38 control the current flow in associated surface units 12-18 respectively when the associated power relay contacts are closed to implement a duty cycle corresponding to the user selected power setting. Triacs 32 through 38 are conventional thyristor devices capable of conducting current in either direction irrespective of the voltage polarity across their main terminals when triggered by either a positive or negative voltage applied to the gate terminals 32(a) through 38(a).

Triac triggering in accordance with user selected power settings is controlled by electronic controller 60. Electronic controller 60 comprises a microprocessor 62, decoder 64 and logic circuitry 66. The user touch key arrays (a)-(d) (FIG. 2) are represented in the circuit of FIG. 3 as keyboard 68. Controller 60 responds to user power setting selections entered via keyboard 68 to generate the appropriate control signals for triacs 32-38 and power control relays 42-48. Gate pulses for triacs 32-38 are provided at output ports R4-R7 respectively of microprocessor 62 which ports are coupled to triac gate terminals 32(a)-38(a) via control driver circuits 72-78 respectively. The gate pulses are provided to gate terminals 32(a)-38(a) at the appropriate rate for implementing the duty cycle associated with the user selected power setting for each surface unit. Duty cycle control may be implemented in well-known, conventional fashion to provide predetermined duty cycle for each power setting. Power relay control signals are provided at microprocessor output ports R8-R11 which ports are coupled to the R inputs of latch circuits 52-58 respectively.

Means for scanning keyboard 68 to detect user inputs include decoder 64 and logic circuitry 66. Decoder 64 in the illustrative embodiment is a conventional 3×8 decoder having its three input lines coupled to output ports R1-R3 of microprocessor 62. Outputs Q1-Q8 of decoder 64 are coupled to eight input enable lines of keyboard 68. Outputs Q1, Q3, Q5 and Q7 are also inputs to logic circuitry 66.

Keyboard 68 has 13 output lines which are input to logic circuit 66. Logic circuit 66 responds to the keyboard and decoder inputs to provide signals to microprocessor 62 at input ports K1, K2, K4 and K8 representing user selected ON, OFF, LOCK and power setting inputs and provides control signals directly to latch circuits 52-58 as appropriate in response to user ON, OFF and LOCK inputs.

Figure 4:
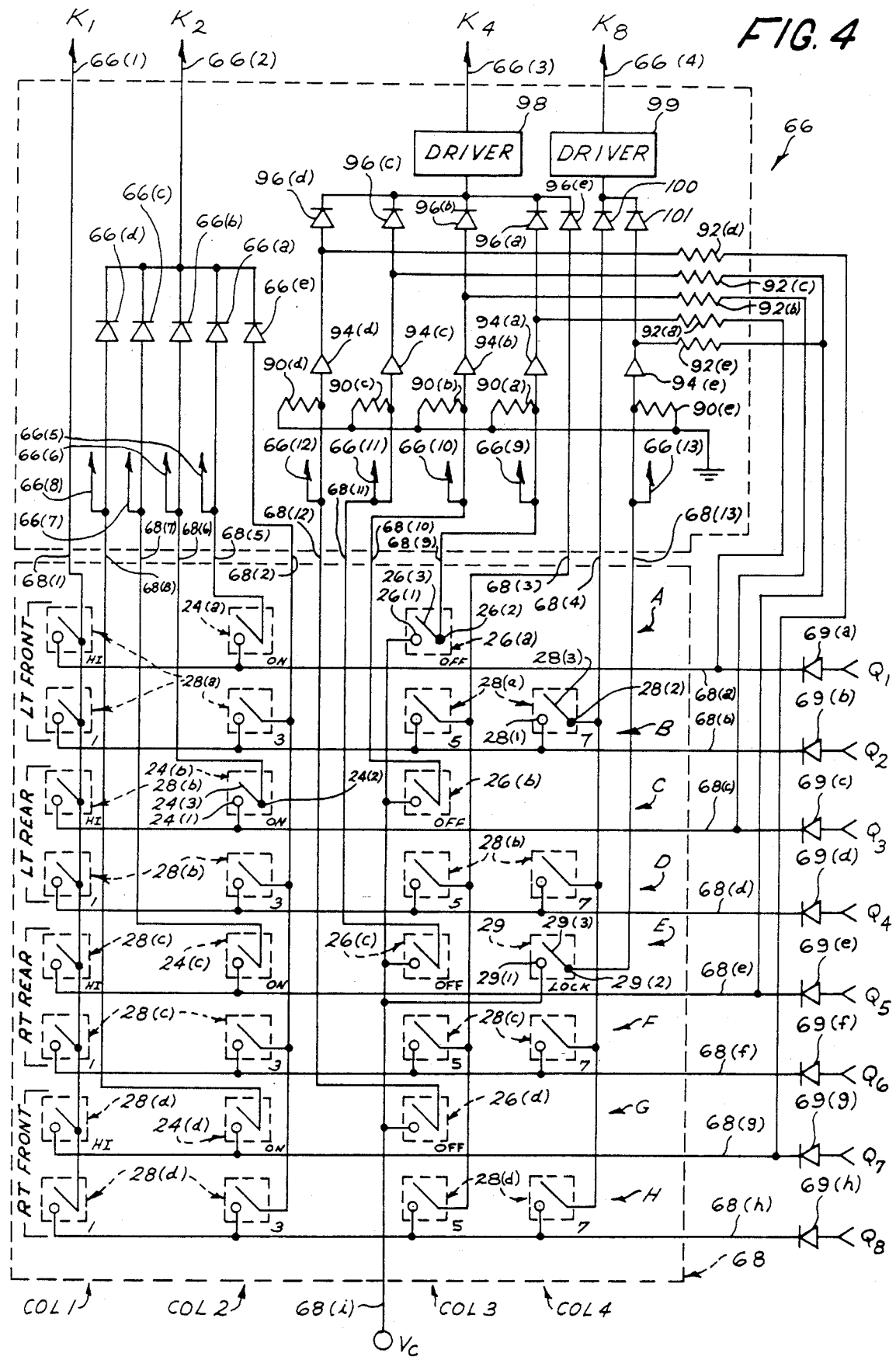
FIG. 4 is a schematic circuit diagram showing details of the touch panel array and logic circuitry shown in block form in FIG. 3.

In operation an enable signal is periodically provided sequentially at outputs Q1 through Q8 to sequentially enable the various rows of touch keys arranged in matrix fashion as will be hereinafter described. The microprocessor monitors inputs K1, K2, K4 and K8 for inputs associated with each enable signal. By this input scanning arrangement utilizing decoder 64 and logic circuitry 66 the user setting selection information for the 28 touch keys is input to microprocessor 62 in multiplex fashion using only the four microprocessor input ports K1, K2, K4 and K8. Such multiplexing is standard design practice. It will be recalled, however, that an object of the present invention is to enable the user to turn off each of the surface units independently of the microprocessor to insure that the user can turn off the surface units even if the microprocessor should malfunction. To this end, means are provided for continuously enabling each of the OFF touch keys of keyboard 68. In this illustrative embodiment as best seen in FIG. 4 a dc voltage source $V_C$ is coupled via each of the OFF touch keys, through logic circuit 66 to the R input of the associated one of latch circuits 52-58. As hereinafter described, by this arrangement user actuation of an OFF key directly affects the associated relay coil control circuit bypassing the microprocessor. LOCK key 29 is also continuously enabled by voltage source $V_C$. Hence, user actuation of the LOCK key bypasses the microprocessor to directly affect all of the relay coil control circuits. Logic circuit 66 directly couples each OFF key to its associated latch circuit and the LOCK key to each of the latch circuits. Logic circuit 66 also permits the multiplexing of the OFF keys to the microprocessor. Thus, this arrangement retains the advantages of conventional matrix multiplexing arrangements while satisfying the user's need to be able to turn off the surface units independently of the microprocessor.

Keyboard circuit 68 and logic circuit 66 will now be described in greater detail with reference to FIGS. 4, 5 and 6. FIG. 4 presents a schematic diagram of keyboard 68 and logic circuit 66. Referring first to the keyboard array 68, the top two rows in the array designated A and B contain the touch keys for controlling the left front surface unit 12, the next two rows C and D contain the control keys for the left rear element 14, the next two rows E and F contain the control keys for the right rear element 16, and the bottom two rows G and H contain the touch key elements for controlling the right front surface unit 18. The array includes OFF keys 26 (a)-(d) for units 12-18 respectively, ON keys 24 (a)-(d) for units 12-18 respectively, the five power setting keys 28 (a)-(d) for selecting power settings 1, 3, 5, 7 and HI for units 12-18 respectively and LOCK key 29 (Column 4, Row E). Each of rows A-H has an associated input scan line designated 68(a)-68(h) respectively coupled to its associated decoder output Q1-Q8 respectively via diode 69(a)-69(h) respectively. Each of array columns 1-4 has an associated output line designated 68(1)-68(4).

Each of power setting keys 28(a)-28(d) has an input terminal 28(1) and an output terminal 28(2) selectively coupled by a switch member 28(3) which momentarily closes the circuit across the input and output terminals when the associated touch key area on the control panel is depressed by the user. Each of power setting key input terminal 28(1) in a particular row is connected to the particular one of input scan lines 68(a)-68(h) associated with that row. Each power setting touch key output terminal 28(2) in a particular column is connected to the particular one of output lines 68(1)-68(4) associated with that column. The ON and OFF keys similarly have input terminals 24(1) and 26(1) respectively and output terminals 24(2) and 26(2) respectively and actuating members 24(3) and 26(3) respectively which momentarily closes across the terminals when actuated by the user. The input terminal for each of the ON keys 24(1) is similarly connected to the particular one of input scan lines 68(a)-68(h) associated with its row. However, the output terminal for each ON key has its own dedicated output line 68(5)-68(8) for ON keys 24(a)-24(d) respectively which runs from the ON key output terminal 24(2) to logic circuit 66. Each OFF key 26(a)-(d) has its input terminal 26(1) directly connected to input line 68(i) from constant DC voltage supply $V_C$. By this arrangement $V_C$ continuously enables each of the OFF keys. The output terminal 26(2) for each OFF key also has its own dedicated output line 68(9)-68(12) for OFF keys 26(a)-26(d) respectively. LOCK key 29 similarly has input and output terminals 29(1) and 29(2) respectively and actuating member 29(3). The input terminal 29(1) is directly connected to input line 68(i) from constant DC voltage supply $V_C$, to continuously enable the LOCK key. Output terminal 29(2) is connected to dedicated output line 68(13).

Keyboard 68 utilizes a total of nine input lines to the keyboard, the eight periodically sequentially enabled input lines 68(a)-68(h) and one continuously enabled input line 68(i), and there are 13 output lines 68(1)-68(13), one for each of the four columns, one for each of the four ON keys, one for each of the four OFF keys, and one for the LOCK key. The thirteen output lines all are input to the logic circuit 66.

Considering now logic circuit 66, the output line 68(1) for column 1 of keyboard 68 is coupled directly to input port K1 of microprocessor 62 via line 66(1). The output lines 68(5)-68(8) from ON switch members 24(a)-(d) respectively are effectively logically ORed using diode logic, specifically diodes 66(a) through 66(d), to provide a single common input to port K2 of microprocessor on output line 66(2). Output line 68(2) for column 2 is similarly ORed with the ON switch output lines via diode 66(e). The output of each ON switch member 24(a)-24(d) is also directly coupled to the set input of its associated latch circuit 52-58 respectively via output lines 66(5)-66(8) respectively.

Output lines 68(9)-68(12) from OFF switch members 26(a)-26(d) respectively are coupled to keyboard input lines 68(a), 68(c), 68(e), and 68(g) to effectively logically AND these OFF output lines with scan signals from Q1, Q3, Q5 and Q7 respectively. In the illustrative embodiment the logic circuitry for this ANDing function comprises resistors 90(a)-90(d), and 92(a)-92(d), and open drain transistors 94(a)-94(d) respectively for keyboard output lines 68(9)-68(12) respectively. The outputs of open drain transistors 94(a)-94(d) are connected to keyboard input lines 68(a), 68(c), 68(e) and 68(g) respectively via resistors 92(a) through 92(d) respectively. Resistors 90(a)-90(d) are connected between the gate inputs of transistors 94(a)-94(d) respectively and system ground. The output of transistors 94(a) through 94(d) respectively are coupled to input port K4 on output line 66(3) via diodes 96(a) through 96(d) respectively which logically OR these outputs to provide a single common input to microprocessor 62 via conventional driver circuitry 98. The output line for keyboard column 3 is similarly coupled to input port K4 via diode 96(c) and driver circuitry 98. Output lines 66(9)-66(12) from OFF switch members 26(a)-26(d) are also coupled to the reset inputs of associated latch circuits 52-58 respectively. Output line 68(13) from LOCK switch member 29 is coupled to keyboard input line 68(e) to effectively logically AND the LOCK output line with the scan signal from Q5. The logic circuitry is similar to the circuitry of the OFF switches comprising resistors 90(e) and 92(e) and open drain transistor 94(e). The output of transistor 94(e) is connected to keyboard input line 68(e) via resistor 92(e). Resistor 90(e) is connected between the gate input of transistor 94(e) and system ground. The output of transistor 94(e) is coupled to input port K8 on output line 66(4) via diode 101 and driver circuitry 99. Output line 68(13) is also coupled to the reset input of each of the latch circuits 52-58 via diodes 1 30(a)-(d) respectively (FIG. 3). The output line for column 4 is coupled to microprocessor input port K8 via diode 100 and driver circuitry 99. Driver circuits 98 and 99 are necessary to compensate for the voltage drop across transistors 94(a)-(d) and 94(e) respectively.

Figure 5:
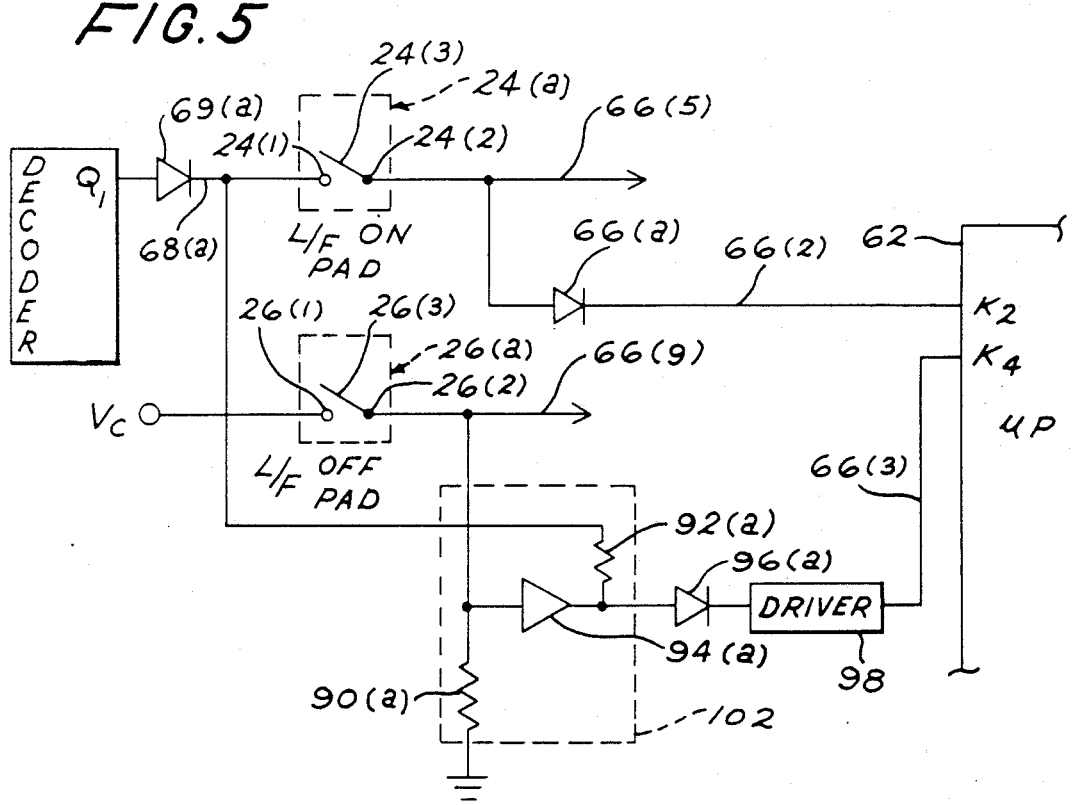
FIG. 5 is a simplified schematic diagram illustrating in greater detail that portion of the circuit of FIG. 4 comprising the ON and OFF touch keys for one of the surface units of the range of FIG. 1.

Referring now to FIG. 5, the manner of operation of the ON and OFF switch members 24(a) and 26(a) and associated logic circuitry for the left front surface heating unit 12 will be described. It will be understood that the manner of operation of the ON and OFF switch members for each of the other surface units operate in a similar fashion. Addressing first the OFF switch 26(a), user actuation of the OFF switch 26(a) closes switch member 26(3) across terminals 26(1) and 26(2) coupling voltage supply $V_C$ directly to the R input of the associated latch circuitry 52 (FIGS. 3 and 6) via line 66(9). Additionally the state of OFF switch 26(a) is logically ANDed with decoder output Q1 by AND logic circuit 102, comprising resistors 90(a) and 92(a) and open drain transistor 94(a). With OFF switch 26 in its open state, transistor 94(a) is in its conductive state with its drain terminal effectively grounded. Hence, no signal is coupled to K4 regardless of the state of decoder output Q1. User actuation of OFF switch 26(a) couples $V_C$ to the gate of transistor 94(a) switching it to its non-conductive state thereby enabling the voltage at its drain terminal to follow decoder output Q1. Hence, when the OFF switch is actuated a scan signal at Q1 is coupled to microprocessor input K4 via diode 96(a) and driver circuitry 98. By this arrangement the status of the various OFF pads is input to input port K4 in multiplex fashion. However, the OFF signal is coupled directly to the associated latch circuit 52 for controlling energization of the power relay coil directly, thereby enabling the user to turn off the circuitry independently of the microprocessor.

It will be appreciated that LOCK switch member 29 operates in a manner very similar to the OFF switch members. Transistor 94(e) in combination with resistor 92(e) effectively logically ANDs the output from LOCK switch member 29 with the scan signal at Q5. The output of this AND circuit is coupled via diode 101 and driver circuitry 99 to microprocessor input port K8. The LOCK signal is also coupled directly to the reset terminal R of each of latch circuits 52-58 via diodes 130(a)-130(d) respectively (FIG. 3). This enables the user to turn off the power circuit for all four surface units by actuation of the single LOCK switch member 29 independently of microprocessor 62.

ON switch member 24(a) effectively logically ANDs user actuation of switch member 24(a) with the scan signal on its associated input scan line 68(a) in the sense that the output coupled to microprocessor input port K2 via diode 66(a) is only present when switch 24(a) is actuated and the scan signal is present on the input scan line from Q1 68(a). The scan signal is coupled to input port K2 and also is applied directly to the set input of the associated latch circuitry 52 via line 66(5) to be hereinafter described with reference to FIG. 7. By this arrangement the status of the various ON pads is input to a common input port K2 of microprocessor 62 in multiplex fashion. Requiring both a user input and a microprocessor output to set a latch circuit prevents the latch circuits from being set inadvertently as a result of a failure of the microprocessor.

Figure 6:
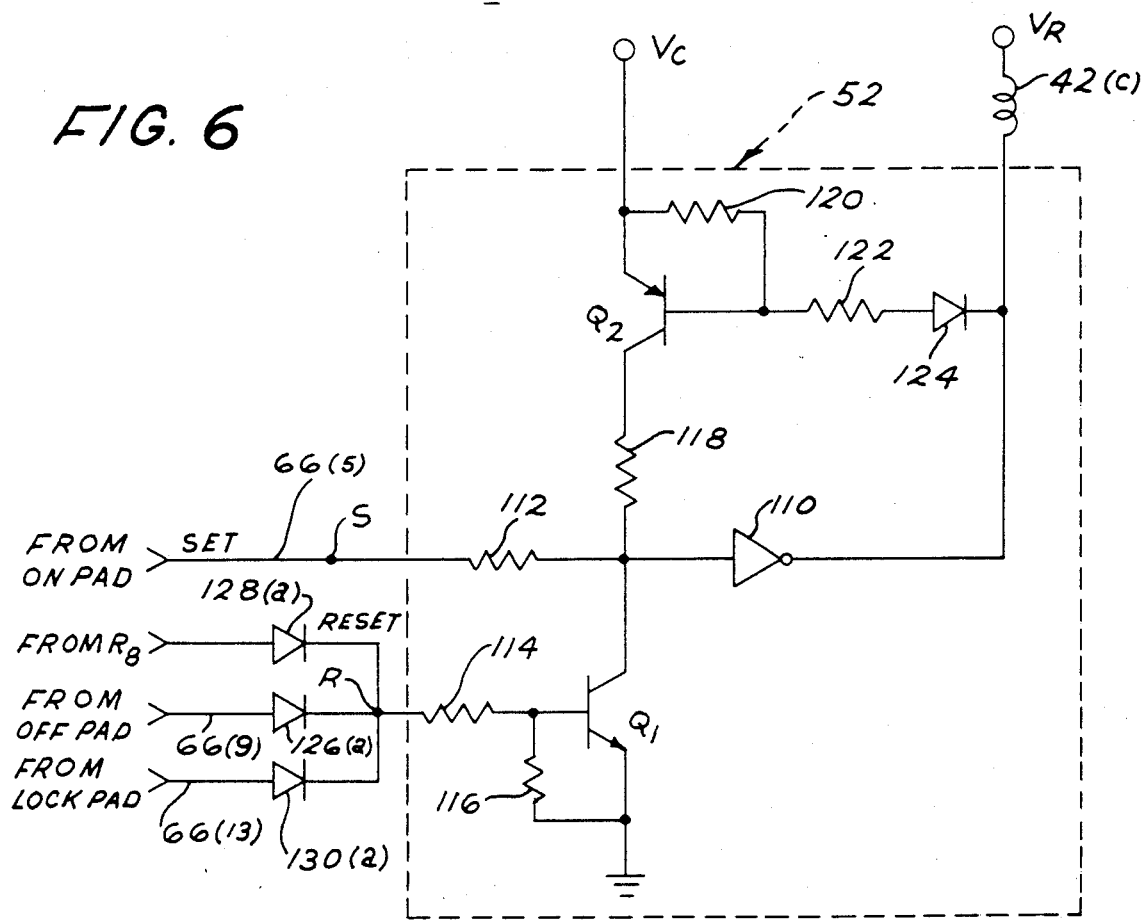
FIG. 6 is a schematic diagram of illustrating in greater detail one embodiment of latch circuitry shown in block form in the circuit of FIG. 3.

Referring now to FIG. 6 electronic latch circuitry 52 for controlling energization of the relay coil 42(c) (FIG. 3) associated with left front surface unit 12 is shown in schematic fashion. It is to be understood that an identical circuit is provided for each of the other three latch circuits 54–58 shown in FIG. 3. Relay coil 42(c) is shown with one terminal connected to DC supply voltage $V_R$ and the other terminal connected to latch circuit 52 at the the collector terminal of open collector driver 110. Latch circuit 52 is a bistable latch circuit switchable between a first or set state and a second or reset state. In its set state latch circuit 52 provides a closed current path for coil 42(c) through the collector terminal of driver 110 to system ground (not shown). In its second or reset state the collector terminal of driver 110 presents a high impedance to the relay coil effectively creating an open circuit condition for the coil.

Latch circuit 52 includes as switching devices, in addition to driver 110, bipolar transistors Q1 and Q2. The set input terminal S for latch circuit 52 is connected to the input terminal of driver 110 and the collector of transistor Q1 via input resistor 112. It will be appreciated that the set input terminal S need not be connected to the collector of Q1 to provide satisfactory latch circuit operation under normal conditions. However, as will be hereinafter described, connection to the collector in the manner shown in FIG. 6 insures that the latch will always reset in the event both the ON and either OFF or LOCK or both are actuated simultaneously. Resistor 114 couples reset input terminal R to the base terminal of transistor Q1. The base of Q1 is coupled to its emitter via bias resistor 116. The emitter of Q1 is coupled to system ground. The collector of Q1 is coupled to the collector of Q2 via a resistor 118. The collector of Q1 is also connected to the gate input of driver 110. The emitter of transistor Q2 is connected to DC supply voltage $V_C$. Biasing resistor 120 couples the emitter of Q2 to its base. The base of Q2 is coupled to ground through resistor 122, diode 124, and the collector terminal of driver 110. Output line 66(9) from logic circuit 66 couples associated OFF switch member 26(a) to reset input terminal R via diode 126(a). The reset output port R8 of microprocessor 62 is similarly coupled to the reset input terminal R of latch circuit 52 via diode 128(a).

In operation a reset signal applied to reset terminal R from OFF switch member 26(a), or LOCK switch member 29, or output R8 of microprocessor 62, switches Q1 into conduction. With Q1 in conduction base current to driver 110 is shunted to ground causing driver 110 to turn off, presenting a high impedance at its output thereby preventing current flow through relay coil 42(c). Similarly, the high impedance presented by the driver 110 prevents base current from flowing in transistor Q2, switching Q2 into its OFF state. With Q2 in its OFF state driver 110 remains in its non-conducting state following removal of the reset signal at terminal R and the circuit remains in its reset state. A momentary positive set signal at the set input S resulting from user actuation of ON touch key 24(a) switches driver 110 into conduction, providing a current path through the coil 42(c) and also providing a base current path for transistor Q2. This switches transistor Q2 into conduction. Upon removal of the set signal, the latch circuit will remain in its set state since base current for driver 110 will continue to be provided through transistor Q2 which remains in its conductive state. However, since Q1 shunts the base current for driver 110, in the event of actuation of the ON switch together with either the LOCK switch or the Stop switch or both the latch will always switch to its reset state.

It will be apparent from the foregoing that user actuation of an OFF key directly resets the latch circuit for the associated heating element, regardless of the state of the scan signals generated by the microprocessor. Hence, the user may turn any of the units off by actuation of the appropriate OFF switch regardless of the operating condition of the microprocessor. Similarly, the LOCK key directly resets all the latch circuits regardless of the state of the scan signals, thereby enabling the user to turn all of the surface units off independently of the microprocessor. It will also be apparent that the latch circuits are set only in response to both user actuation of the ON touch key and a scan signal from the microprocessor. Hence, the latch circuits cannot be inadvertently set due to a microprocessor failure.

The following components and component values are believed suitable for use in the circuit of FIGS. 3–6. These components and values are exemplary only and are not intended to limit the scope of the claimed invention.

| Surface Units | |
|---|---|
| 12–18 | General Electric WB30X218 |
| Triacs | |
| 32–38 | General Electric SC 152 |
| Power Relays (42–48) | |
| Aromat | JC-2 |
| Microprocessor | |
| 62 | Texas Instruments TMS 2300 |
| Diodes | |
| 66(a)–66(c) | 1N914 |
| 69(a)–69(h) | 1N914 |
| 96(a)–96(e) | 1N914 |
| 100, 101 | 1N914 |
| 124 | 1N914 |
| 126(a)–126(d) | 1N914 |
| 128(a)–128(d) | 1N914 |
| 130(a)–130(d) | 1N914 |
| Transistors | |
| Q1 | 2N2222 |
| Q2 | 2N2907 |
| Integrated Circuits | |
| 64 MC 140288 | (Motorola) |
| 110 | ULN 2004A |
| 94(a)–94(e) | 74C906 |
| Fixed Resistors (Ω) | |
| 90(a)–90(e) | 10K |
| 112, 114, 118, 120 | 22K |
| 92(a)–92(e) | 10K |
| 116 | 27K |
| 122 | 10K |
| DC Supply Voltages | |
| $V_R$ | 20 volts |
| $V_C$ | 15 volts |

As will be hereinafter described in greater detail the control program implemented by microprocessor 62 includes a routine for generating a software initiated reset signal for resetting the latch circuitry.

Microprocessor 62 is customized to control the state of the power control relay in accordance with the ON/OFF and LOCK inputs of the user and to control the output power of the surface heating units in accordance with the user selected power settings by permanently configuring the Read Only Memory (ROM) of microprocessor 62 to implement predetermined control instructions.

A primary function of microprocessor 62 relevant to the present invention is to insure that a reset signal is generated for application to the appropriate one of latch circuits 52-58 whenever the currently implemented user input selection for a particular surface unit is the OFF setting. A second primary function relevant to the present invention is to require the user to enter a power setting within a predetermined time period following actuation of the ON switch. Failure to enter a power setting during this interval will result in the latch circuitry being reset, and the system reverting to its OFF mode. The reason for this feature is to prevent the power relays remaining closed for any significant length of time with no power setting being implemented, such as could otherwise result if the user were to intentionally or inadvertently actuate the ON switch without thereafter entering a power setting selection. In the illustrative embodiment the user is provided with a time period on the order of 8.5 seconds within which to enter a power setting after actuation of the associated ON switch. Failure to enter the power setting within this time period results in the system reverting to its OFF mode with the microprocessor generating a reset signal effective to de-energize the coil and thereby open the power control relay contacts, isolating the surface unit from the power line.

For the sake of simplicity and brevity, the description of the control program implemented by microprocessor 62 will be described on an essentially functional basis and only to the extent necessary to understand and appreciate the control signals relating to the ON/OFF circuit arrangement of the present invention. The software implementation of LOCK/UNLOCK feature of the illustrative embodiment does not form a part of the present invention, and can take one of many known forms and thus will not be described herein in any detail. For example, the microprocessor may be programmed to respond to the actuation of the LOCK key by thereafter implementing the OFF mode for all surface units and refusing to accept subsequent user inputs except for a predetermined unlocking sequence of entries, such as, for example, actuation of the power setting 1, power setting 5 and power setting HI, keyed in that order. Following user entry of the appropriate unlocking sequence, system operation returns to its normal mode, looking for actuation of an ON touch key to initiate implementation of a user selected power setting. It should be understood that the control program may include, in addition to the relay control routine herein described, other control routines including a LOCK/UNLOCK routine and a routine for performing the duty cycle power control function.

The flow diagram of FIG. 7 illustrates a portion of the control routine utilized in the main control program to control the status of the power control relay. From this diagram, one of ordinary skill in the programming art could prepare a set of instructions for permanent storage in the Read Only Memory (ROM) of microprocessor 62 to implement this routine. It will be appreciated that instructions for carrying out the routine described in the flow diagram of FIG. 7 may be interleaved with instructions and routines for these other control functions.

The main executive control program, of which the routine illustrated in FIG. 7 forms a part, is cycled through once each 133 milliseconds. It should be noted that the control circuit is continuously energized while the appliance is plugged in so that the control program for heating elements 12 through 18 is cycled through every 133 milliseconds even when the OFF setting is being implemented. The relay control program of FIG. 7 is shown only for one single heating element. It will be understood that a similar routine may be executed successively for each heating element.

The control program utilizes two memory storage locations designated KB and M(KB) for user selected inputs. When a new user input is first detected it is initially stored at location KB. When KB is determined by the program to be a valid input, it is then stored as M(KB).

On entering the relay control routine, Inquiry 132 determines whether the newly entered power setting stored in temporary memory as KB is the OFF setting. If so, the TIME register is reset to zero (Block 133) and a high signal is generated at output port R8 to reset latch circuit 52 (Block 134). A zero representing the OFF setting is stored in permanent memory location M(KB) and is also stored in temporary memory location KB (Block 136), and the program returns (Block 139) to the main executive program. If the new entry KB is not an OFF setting, Inquiry 138 determines if KB represents an ON setting. If not, Inquiry 140 determines whether the previous user entry stored at M(KB) is greater than zero hence representing a power setting, or not greater than zero representing an OFF setting. If M(KB) is greater than zero, then the new entry KB represents merely a change to a different power setting. Such an entry is valid. Thus KB is transferred to the permanent memory location M(KB) (Block 142) and the program returns to the main execution program (Block 139). If the answer at Inquiry 140 is No, this indicates that the user is attempting to enter a power setting without first entering the ON setting. This is an invalid entry and results in a reset signal being generated (Block 134) and both the permanent memory M(KB) and temporary memory KB being set to zero (Block 136). The program then returns (Block 139) to the main executive program.

If the newly entered user input is an ON input (Yes at Inquiry 138), the TIME variable, representing the time elapsed since actuation of the ON key, is incremented (Block 144). Inquiry 146 then determines whether the TIME exceeds the predetermined reference value Time Out corresponding to 8.5 seconds. If not, the ON input is stored in permanent memory location M(KB) (Block 148), the reset signal is removed from R8 (Block 150), and the program returns to the main executive program (Block 139). On each pass through this routine following the user actuation of the ON switch, the loop comprising Inquiries 132 and 138, Block 144 Inquiry 146, Block 148, and Block 150 is repeated until either the user enters a power setting or TIME exceeds the Time Out reference. If TIME is greater than Time Out, TIME is reset to zero (Block 133), latch circuit 52 is reset (Block 134) and M(KB) and KB (Block 136) are set to zero just as if an OFF setting had been entered.

By this arrangement, if the user fails to enter a valid power setting within the predetermined 8.5 second time period, the corresponding latch circuit is reset thereby opening the power relays and the control program requires the user to reactuate the ON touch key before it will recognize subsequent power setting entries.

While in accordance with the Patent Statutes a specific embodiment of the present invention has been illustrated and described herein, it is realized that numerous modifications and changes will occur to those skilled in the art. For example, the appliance incorporating the illustrative embodiment of the present invention is a cooking appliance using resistance heating elements as the electrical loads being controlled. This control arrangement, however, is readily adaptable to other types of appliances in which a plurality of electrical loads is to be controlled in accordance with user selected inputs and in which the electrical loads themselves may be other than purely resistive loads. It is therefore to be understood that the appended claims are intended to cover all such modifications and changes as fall within the true spirit and scope of the invention.

What is claimed is:

1. A control circuit for an appliance of the type incorporating an electrical load adapted for energization by an external power supply said circuit comprising:
    input means comprising a plurality of user actuable switch means including a first condition selection switch means and a second condition selection switch means;
    an electronic controller for controlling energization of said electrical load in accordance with user actuation of said input means, said controller including scanning means operative to periodically enable at least some of said switch means including said first condition selection switch means to detect user actuation thereof;
    means for constantly enabling said second condition selection switch means;
    a power control relay operative in a first state to enable energization of the electrical load by the external power supply and in a second state to prevent energization of the load;
    electronic latch circuit means switchable between a first state and a second state, said latch circuit means being effective in its first state to establish said first state for said relay and in its second state to establish said second state for said relay;
    said first condition selection switch means being operative when actuated and enabled to switch said latch means to its first state;
    said second condition selection switch means being operative when actuated to switch said latch circuit means in its second state independent of said scanning means.

2. A control circuit in accordance with claim 1 wherein said controller further comprises means for selectively generating a reset signal operative to switch said latch circuit means to its second state independent of said second condition selection switch means.

3. A control circuit arrangement for an appliance of the type having a plurality of electrical loads selectively energized in accordance with user inputs, said circuit arrangement comprising:
    an electronic controller for controlling energization of the plurality of electrical loads in accordance with user inputs;
    input means comprising a plurality of user actuable switch members including a switch member for selecting a first appliance operating condition and a switch member for selecting a second appliance operating condition for each of the electrical loads, said switch members disposed in a matrix array having a plurality of input scan lines and a plurality of output lines, at least some of said switch members including said first condition selection switch members, being operative to produce an output signal on an associated output line when user actuated and an associated input line is enabled, and at least some of said switch members including said second condition selection members, being operative when actuated to produce an output signal on an associated output line when user actuated regardless of the state of its associated input scan line;
    said controller including scanner circuit means connected to said plurality of matrix input lines operative to periodically sequentially enable said input lines;
    circuit means connected to said second condition selection switch members operative to continuously enable said second condition selection switch members;
    logic circuit means responsive to input and output lines associated with said second condition selection switch members and operative to provide a representative signal to a common input of said controller when any of said second condition selection members is actuated and its associated input line is enabled, whereby the state of each of said second condition selection switch members is input to said controller in multiplex fashion;
    one or more power relays, each relay being associated with one of said loads, each of said relays being operative in a first state to enable energization of its associated load by an external power supply and in a second state to prevent energization of its associated load;
    a plurality of electronic latch circuit means each having first and second inputs for switching said latch means to first and second states respectively in response to signals applied to said first and second inputs respectively, each of said latch circuit means being operatively coupled with an associated one of said relays effective to establish said first state for its associated relay in its first state and said second state for its associated relay in its second state;
    said matrix output line associated with each first condition selection switch member being coupled to said first input of its associated latch circuit means, and said output line associated with each second condition selection switch member being coupled to said second input of its associated latch circuit means;
    whereby each of said latch circuit means is switched to its first state when its associated first condition selection switch member is actuated and the associated input scan line is enabled, and switched to its second state whenever its associated second condition selection switch member is actuated, said second condition selection switch members by this arrangement being effective when actuated to interrupt energization of associated loads independently of said controller.

4. The control circuit of claim 3 wherein said matrix array further comprises switch members for selecting a third operating condition, and wherein said circuit means is connected to said third condition selection switch member and operative to continuously enable said third condition selection switch member; said third condition selection switch member being thereby operative when actuated to produce an output signal on an associated output line when user actuated regardless of the state of its associated input line;

said output line associated with said third condition selection switch member being coupled to said second input of each of said latch circuit means whereby user actuation of said third condition selection switch member switches each of the latch circuit means to its second state thereby interrupting energization of all of the loads independently of said controller.

5. The control circuit of claim 4 wherein said first, second and third operating conditions comprise ON, OFF and LOCK operating conditions respectively.

6. The control circuit of claim 3 wherein said controller further comprises a plurality of reset output lines each coupled to said second input of an associated one of said latch circuit means permitting said controller to open said power relays independently of said second condition selection switch member.

7. The control circuit of claim 6 wherein said logic circuit means comprises AND logic means operative to logically AND second function selection switch associated output lines with second function selection switch associated input lines to provide the output on an associated logic line when a second function selection switch member is actuated and its associated input line is enabled; and OR logic means operative to logically OR each of said logic lines to provide said representative signal.

8. A control circuit for a cooking appliance of the type having a pluraltiy of electrical surface units energized by an external power supply in accordance with user selected power setting, said circuit comprising:
a power relay for each surface unit, each relay comprising a set of contacts for coupling its associated surface unit to the external power supply and a relay coil adapted for energization by an external power supply;
a voltage supply for energizing said relay coils;
a control circuit for each of said relay coils each of said circuits including electronic latch circuit means operatively coupling its associated relay coil to said voltage supply; each of said latch circuit means being operative in a first and a second state to establish first and second operating conditions respectively for its associated relay coil; said first and second operating conditions for each of said relay coils respectively enabling and preventing energization of its associated sruface unit;
input means comprising a plurality of user actuable switch means including an ON switch means and OFF switch means associated with each of the surface units;
an electronic controller for controlling energization of the surface units in accordance with user inputs entered via said input means, said controller comprising scanning means operative to periodically apply scan signals to at least some of said pluraltiy of switch means;
said input means being operatively coupled to each of said latch circuit means such that user actuation of one of said ON switch means couples said scan signal when applied to said one ON switch to the associated one of said latch circuit means effective to switch said latch circuit means to its first state;
means for constantly enabling each of said OFF switch means such that each of said OFF switch means is operative in response to user actuation thereof to apply an OFF signal to its associated latch circuit means effective to switch said associated latch means to its second independently of said scan signal; whereby energization of each of said surface units may be prevented by user actuation of its associated OFF switch means independently of said electronic controller.

9. The control circuit of claim 8 wherein each of said ON switch means is coupled to a first common input to said controller and operative when actuated to couple a scan signal applied thereto to said first common controller input and wherein a scan signal is periodically sequentially applied to each of said ON switches whereby the state of said ON switches is input to said controller in multiplex fashion.

10. The control circuit of claim 8 wherein each of said OFF switch means includes an output coupled to a second common input to said controller, said circuit further comprising means for logically ANDing said periodic scan signals sequentially with said OFF signal from each of said OFF switch means whereby the state of said OFF switches is input to said controller in multiplex fashion.

11. The control circuit of claim 9 wherein each of said OFF switch means includes an output coupled to a second common input to said controller, said circuit further comprising means for logically ANDing said periodic scan signals sequentially with said OFF signal from each of said OFF switch means whereby the state of said OFF switches is input to said controller in multiplex fashion.

12. A control circuit for an electric cooking appliance of the type incorporating a plurality of surface heating units and enabling the user to select from a plurality of power settings for each surface unit, said circuit comprising:
a plurality of power relays, each being associated with a particular one of the plurality of appliance surface heating units, each of said relays including contacts operative when closed to enable energization of its associated surface unit by an external power supply, and a relay coil operative in a first operating condition to close its relay contacts and in a second operating condition to open its contacts;
a plurality of electronic latch circuit means each operatively coupled to an associated one of said relay coils and effective in a first state and a second state to establish said first and second operating conditions respectively for its associated relay coil;
input means comprising a plurality of user actuable switch means including an ON switch means and an OFF switch means for each of the surface heating units;
electronic control means for controlling energization of the surface units in accordance with user inputs, said control means including means for periodically applying a scan signal sequentially to at least some of said plurality of user actuable switch means to detect user actuation thereof;
means for coupling each of said plurality of said ON switch means to a first common input to said controller and means for coupling said plurality of OFF switch means to a second common input to said controller;
said means for coupling said pluraltiy of ON switch means being effective to couple a scan signal applied to any one of said ON switches to said first common input when said one ON switch is actuated thereby enabling the controller to detect actuation of each of said plurality of ON switch means in multiplex fashion;

means for constantly enabling said OFF switch means such that each of said OFF switch means is operative when actuated to generate an OFF signal, which signal is coupled to the associated one of said latch circuit means, said OFF signal being effective to place its associated latch circuit means in its second state;

said means for coupling said plurality of OFF switch means to said second common controller input including means for logically ANDing the OFF signal generated by any one of said OFF switch means with the scan signal applied to said one OFF switch means, the output of said AND means signifying actuation of said one OFF switch means thereby enabling the controller to detect actuation of each of said plurality of OFF switch means in multiplex fashion;

whereby the state of each of said ON and OFF switch means is input to said controller in multiplex fashion and each of said OFF switch means is directly coupled to its associated latch circuit to prevent energization of the surface units in direct response to user actuation of said OFF switch means independently of said controller.

13. The circuit of claim 12 wherein said power relay comprises a normally open relay, said coil being energized in its first operating condition and de-energized in its second operating condition.

* * * * *